(12) United States Patent
Seigler et al.

(10) Patent No.: US 7,961,417 B2
(45) Date of Patent: Jun. 14, 2011

(54) HEAT ASSISTED MAGNETIC RECORDING APPARATUS HAVING A PLURALITY OF NEAR-FIELD TRANSDUCERS IN A RECORDING MEDIA

(75) Inventors: Michael Allen Seigler, Pittsburgh, PA (US); Xuhui Jin, Shakopee, MN (US); Hua Zhou, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 96 days.

(21) Appl. No.: 12/371,988

(22) Filed: Feb. 17, 2009

(65) Prior Publication Data

US 2010/0208378 A1 Aug. 19, 2010

(51) Int. Cl.
*G11B 5/02* (2006.01)
(52) U.S. Cl. .......... 360/59; 369/13.33; 369/13.13
(58) Field of Classification Search .......... 360/59, 360/135; 369/13.33, 13.13, 13.32, 13.17, 369/112.09, 112.14, 112.21, 112.27; 385/129, 385/31, 88–94
See application file for complete search history.

(56) References Cited

U.S. PATENT DOCUMENTS

| | | | |
|---|---|---|---|
| 5,602,820 A * | 2/1997 | Wickramasinghe et al. . | 369/126 |
| 6,493,164 B1 * | 12/2002 | Kikitsu et al. .......... | 360/59 |
| 6,703,099 B2 | 3/2004 | Belser | |
| 6,865,044 B1 * | 3/2005 | Albrecht et al. ........ | 360/59 |
| 7,155,732 B2 | 12/2006 | Rausch et al. | |
| 7,521,137 B2 * | 4/2009 | Hohlfeld et al. ........ | 428/831.2 |
| 7,710,686 B2 * | 5/2010 | Kim et al. .............. | 360/125.3 |
| 2001/0015937 A1 * | 8/2001 | Yamaguchi et al. ..... | 369/13 |
| 2002/0136927 A1 | 9/2002 | Hieda et al. | |
| 2004/0240327 A1 * | 12/2004 | Sendur et al. ......... | 369/13.35 |
| 2005/0078565 A1 | 4/2005 | Peng et al. | |
| 2005/0157597 A1 * | 7/2005 | Sendur et al. ......... | 369/13.55 |
| 2005/0193405 A1 | 9/2005 | Hattori et al. | |
| 2006/0154110 A1 | 7/2006 | Hohlfeld et al. | |
| 2007/0217075 A1 | 9/2007 | Kamata et al. | |
| 2008/0024896 A1 | 1/2008 | Ohta et al. | |
| 2008/0075978 A1 | 3/2008 | Weller et al. | |
| 2009/0004509 A1 | 1/2009 | Benakli et al. | |
| 2010/0061018 A1 * | 3/2010 | Albrecht et al. ........ | 360/135 |
| 2010/0091618 A1 * | 4/2010 | Schabes et al. ........ | 369/13.02 |

* cited by examiner

*Primary Examiner* — Tan X Dinh
(74) *Attorney, Agent, or Firm* — Robert P. Lenart, Esq.; Pietragallo Gordon Alfano Bosick & Raspanti, LLP

(57) ABSTRACT

An apparatus includes a recording media including a substrate, a plurality of islands of magnetic material on the substrate, and a non-magnetic material between the islands, a recording head having an air bearing surface positioned adjacent to the recording media, and including a magnetic pole, and an optical transducer, wherein the optical transducer directs electromagnetic radiation onto recording media to heat portions of the recording media and a magnetic field from the magnetic pole is used to set the direction of the magnetization in the heated portions of the recording media, and a plurality of near-field transducers, each positioned adjacent to one of the islands to increase coupling between the electromagnetic radiation and the magnetic material.

20 Claims, 10 Drawing Sheets

HEAT ASSISTED MAGNETIC RECORDING APPARATUS HAVING A PLURALITY OF NEAR-FIELD TRANSDUCERS IN A RECORDING MEDIA

BACKGROUND

Heat assisted magnetic recording (HAMR) generally refers to the concept of locally heating recording media to reduce the coercivity of the media so that the applied magnetic writing field can more easily direct the magnetization of the media during the temporary magnetic softening of the media caused by the heat source. A tightly confined, high power laser light spot is used to heat a portion of the recording media to substantially reduce the coercivity of the heated portion. Then the heated portion is subjected to a magnetic field that sets the direction of magnetization of the heated portion. In this manner the coercivity of the media at ambient temperature can be much higher than the coercivity during recording, thereby enabling stability of the recorded bits at much higher storage densities and with much smaller bit cells.

One approach for directing light onto recording media uses a planar solid immersion mirror (PSIM) or lens, fabricated on a planar waveguide and a near-field transducer (NFT), in the form of an isolated metallic nanostructure, placed near the PSIM focus. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an adjacent media and get absorbed, raising the temperature of the media locally for recording.

The power absorption in the recording media is highly dependent on head to media spacing (HMS), power output from NFT or laser etc. In such a system, the typical power output depends inverse exponentially with HMS due to the evanescent decay of optical near-field. Such variation may lead to variation of the thermal spot size. As the areal density increases, there is a need to more tightly control the size of the heated portion of the media.

SUMMARY

In one aspect, the invention provides an apparatus including a recording media including a substrate, a plurality of islands of magnetic material on the substrate, and a non-magnetic material between the islands, a recording head having an air bearing surface positioned adjacent to the recording media, and including a magnetic pole, and an optical transducer, wherein the optical transducer directs electromagnetic radiation onto recording media to heat portions of the recording media and a magnetic field from the magnetic pole is used to set the direction of the magnetization in the heated portions of the recording media, and a plurality of near-field transducers, each positioned adjacent to one of the islands to increase coupling between the electromagnetic radiation and the magnetic material.

In another aspect, the invention provides an apparatus including a recording media including a substrate, and a continuous layer of magnetic material on the substrate, a recording head having an air bearing surface positioned adjacent to the recording media, and including a magnetic pole, and an optical transducer, wherein the optical transducer directs electromagnetic radiation onto recording media to heat portions of the recording media and a magnetic field from the magnetic pole is used to set the direction of the magnetization in the heated portions of the recording media, and a plurality of near-field transducers embedded in the magnetic material.

DETAILED DESCRIPTION OF THE INVENTION

In one aspect, this invention uses a bit patterned media (BPM) in a HAMR system for greater areal density. The bit patterned media includes embedded near-field transducers adjacent to islands of magnetic material. The direction of magnetization of the magnetic material is controlled to represent a single data bit per island.

Figure 1:
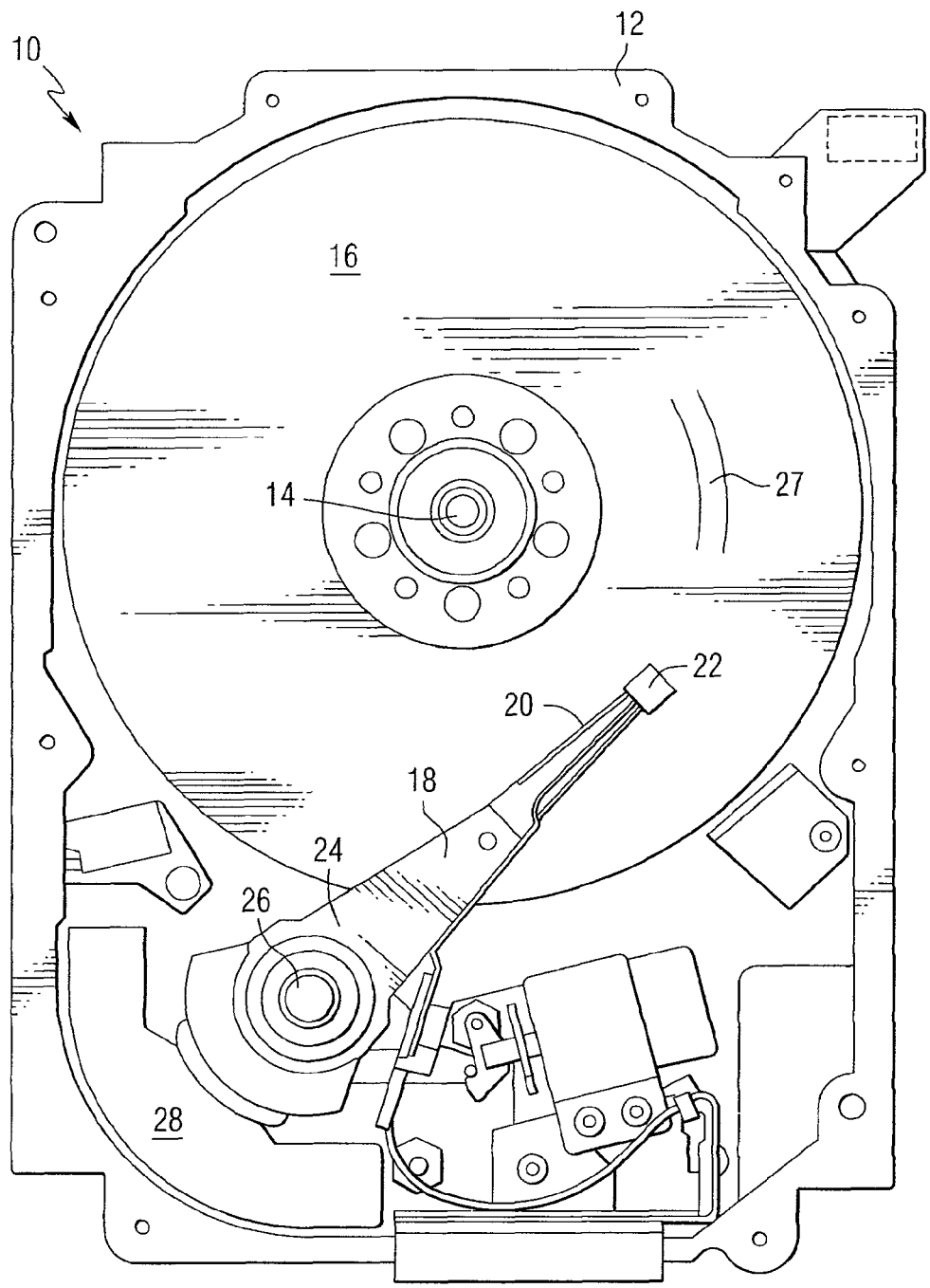
FIG. 1 is a pictorial representation of a data storage device in the form of a disc drive that can include a transducer in accordance with an aspect of this invention.

FIG. 1 is a pictorial representation of a data storage device in the form of a disc drive 10 that can utilize bit patterned recording media constructed in accordance with an aspect of the invention. The disc drive 10 includes a housing 12 (with the upper portion removed and the lower portion visible in this view) sized and configured to contain the various components of the disc drive. The disc drive 10 includes a spindle motor 14 for rotating at least one magnetic recording media 16 within the housing. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired track 27 of the disc 16. The actuator motor 28 is regulated by a controller, which is not shown in this view and is well-known in the art.

For heat assisted magnetic recording (HAMR), electromagnetic radiation, for example, visible, infrared or ultraviolet light is directed onto a surface of the recording media to raise the temperature of a localized area of the media to facilitate switching of the magnetization of the area. Recent designs of HAMR recording heads include a thin film waveguide on a slider to guide light to the recording media for localized heating of the recording media. A near-field transducer positioned at the air bearing surface of a recording head can be used to direct the electromagnetic radiation to a small spot on the recording media.

Figure 2:
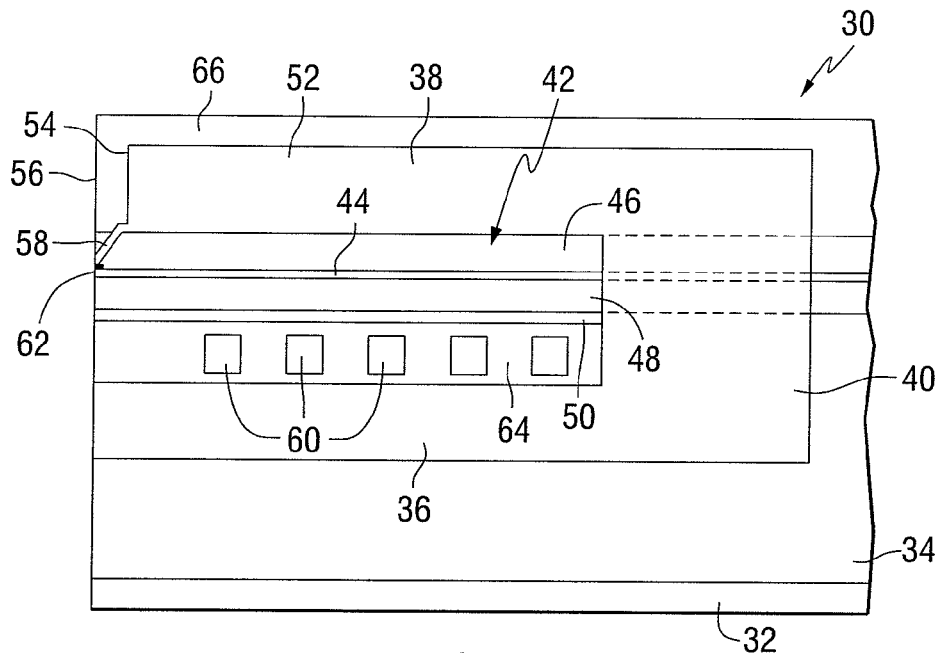
FIG. 2 is a cross-sectional view of a recording head for use in heat assisted magnetic recording.

FIG. 2 is a cross-sectional view of an example of a recording head for use in heat assisted magnetic recording. The recording head 30 includes a substrate 32, a base coat 34 on the substrate, a bottom pole 36 on the base coat, and a top pole 38 that is magnetically coupled to the bottom pole through a yoke or pedestal 40. A waveguide 42 is positioned between the top and bottom poles. The waveguide includes a core layer 44 and cladding layers 46 and 48 on opposite sides of the core layer. A mirror 50 is positioned adjacent to one of the cladding layers. The top pole is a two-piece pole that includes a first portion, or pole body 52, having a first end 54 that is spaced from the air bearing surface 56, and a second portion, or sloped pole piece 58, extending from the first portion and tilted in a direction toward the bottom pole. The second portion is structured to include an end adjacent to the air bearing surface 56 of the recording head, with the end being closer to the waveguide than the first portion of the top pole. A planar coil 60 also extends between the top and bottom poles and around the pedestal. A near-field transducer (NFT) 62 is positioned in the cladding layer 46 adjacent to the air bearing surface. An insulating material 64 separates the coil turns. Another layer of insulating material 66 is positioned adjacent to the top pole.

Figure 3:
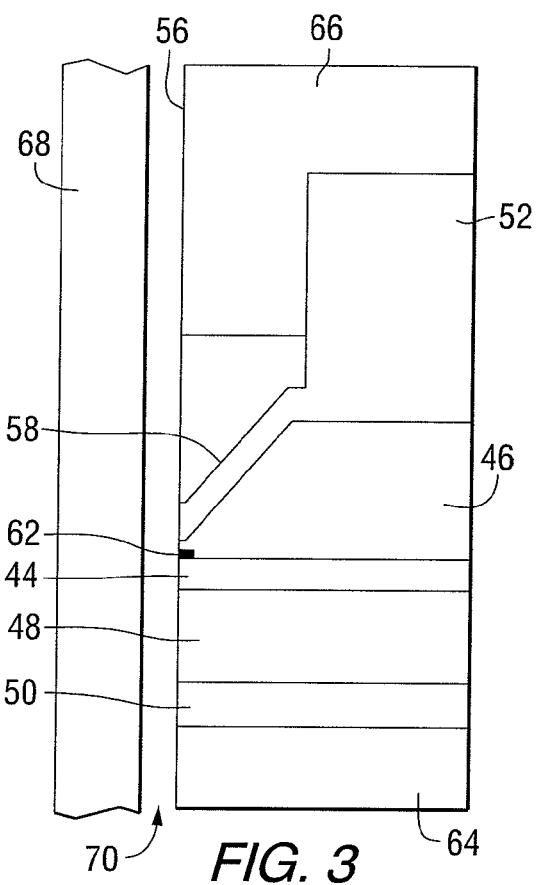
FIG. 3 is an enlarged view of a portion of the recording head of FIG. 2.

FIG. 3 is an enlarged view of a portion of the recording head of FIG. 2. When used in a data storage device, the recording head is positioned adjacent to a data recording media 68 and separated from the recording media by an air bearing 70. Light is coupled into the waveguide and directed toward the recording media to heat a portion of the recording media, thereby reducing the coercivity of the heated portion. The near-field transducer serves to concentrate the light into a small spot on the recording media. A magnetic field from the write pole is used to set the direction of magnetization of the heated portion of the recording media.

Figure 4:
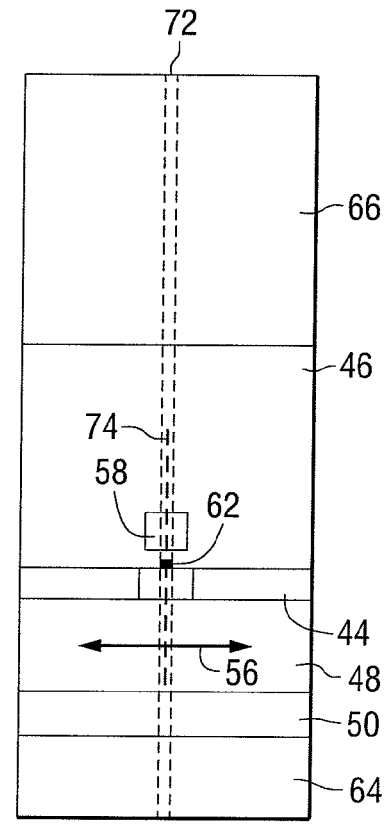
FIG. 4 is an enlarged view of a portion of the air bearing surface of the recording head of FIG. 2.

FIG. 4 is an enlarged view of a portion of the air bearing surface of the recording head of FIG. 2. In operation, data is stored in tracks on the media. An approximate location of a data track is illustrated as item 72 in FIG. 4. The near-field transducer and the end of the write pole are aligned on a common line 74 in a direction parallel to the track direction.

The waveguide conducts energy from a source of electromagnetic radiation, which may be, for example, ultraviolet, infrared, or visible light. The source may be, for example, a laser diode, or other suitable laser light source for directing a light beam toward the waveguide. Various techniques that are known for coupling the light beam into the waveguide may be used. For example, the light source may work in combination with an optical fiber and external optics for collimating the light beam from the optical fiber toward a diffraction grating on the waveguide. Alternatively, a laser may be mounted on the waveguide and the light beam may be directly coupled into the waveguide without the need for external optical configurations. Once the light beam is coupled into the waveguide, the light propagates through the waveguide toward a truncated end of the waveguide that is formed adjacent the air bearing surface (ABS) of the recording head. Light exits the end of the waveguide and heats a portion of the media, as the media moves relative to the recording head. A near-field transducer can be positioned in or adjacent to the waveguide to further concentrate the light in the vicinity of the air bearing surface.

As illustrated in FIGS. 2, 3 and 4, the recording head 30 also includes a structure for heating the magnetic recording media 68 proximate to where the write pole 58 applies the magnetic write field H to the recording media 68. While FIGS. 2, 3 and 4 show an example recording head, it should be understood that the invention is not limited to the particular structure shown in FIGS. 2, 3 and 4.

Figure 5:
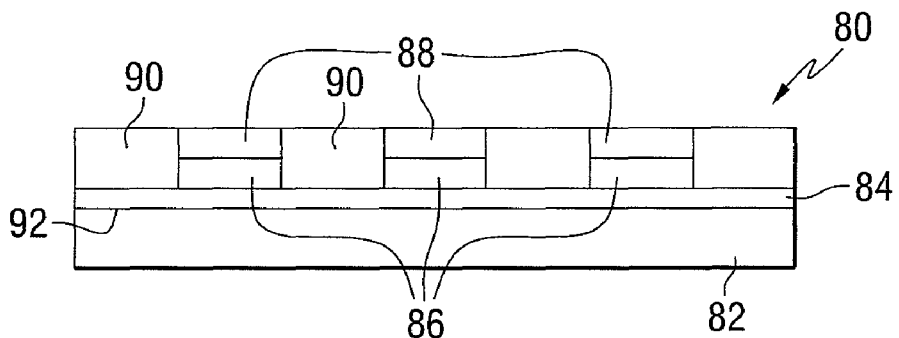
FIG. 5 is a cross-sectional view of a recording media constructed in accordance with an aspect of the invention.

FIG. 5 is a cross-sectional view of a recording media 80 constructed in accordance with an aspect of the invention. The media includes a substrate 82 and thermal control layer 84, or thermal resistor, on the substrate. A plurality of islands 86 of magnetic material are positioned in an array on the thermal control layer. A plurality of near-field transducers (NFT) 88 are positioned adjacent to the islands. A non-magnetic filler material 90 is positioned between the islands and the NFTs. The substrate can be coated with a heatsink material 92. The media of FIG. 5 can be used in combination with a recording head that directs light onto the media. The recording head can also include a near-field transducer, but such near-field transducer in the recording head is optional. The thermal resistor is an optional layer that helps the magnetic elements of the media heat up before all the heat flows into the substrate. For example, when the near-field transducer absorbs power, it is desirable to have heat to flow into the FePt media instead of the substrate. With the resistor, more of the heat will flow to the magnetic elements of the media.

The substrate can be, for example, silicon, glass, or aluminum. These substrates may be coated with a heatsinking material such as Cu or Au. The thermal control layer can be, for example, MgO, $Al_2O_3$, $Ta_2O_5$, $Si_3N_4$, $SiO_2$ or SiON. The main design criteria for the thermal control layer are the vertical and longitudinal thermal conductivity. The magnetic material can be, for example, FePt, CoPt multilayers, CoPtCr or SmCo. The near-field transducer material can be, for example, one or more of Au, Ag, Al, or Cu, or an alloy of Au, Ag, Al, or Cu and one or more of Pt, Pd, Rh, Ir, Cr, Ta, Fe, and Co. The filler material can be, for example, MgO, $Al_2O_3$, $Ta_2O_5$, $Si_3N_4$, $SiO_2$ or SiON. The main design criteria for the filler material are to have a low thermal conductivity.

Figure 6:
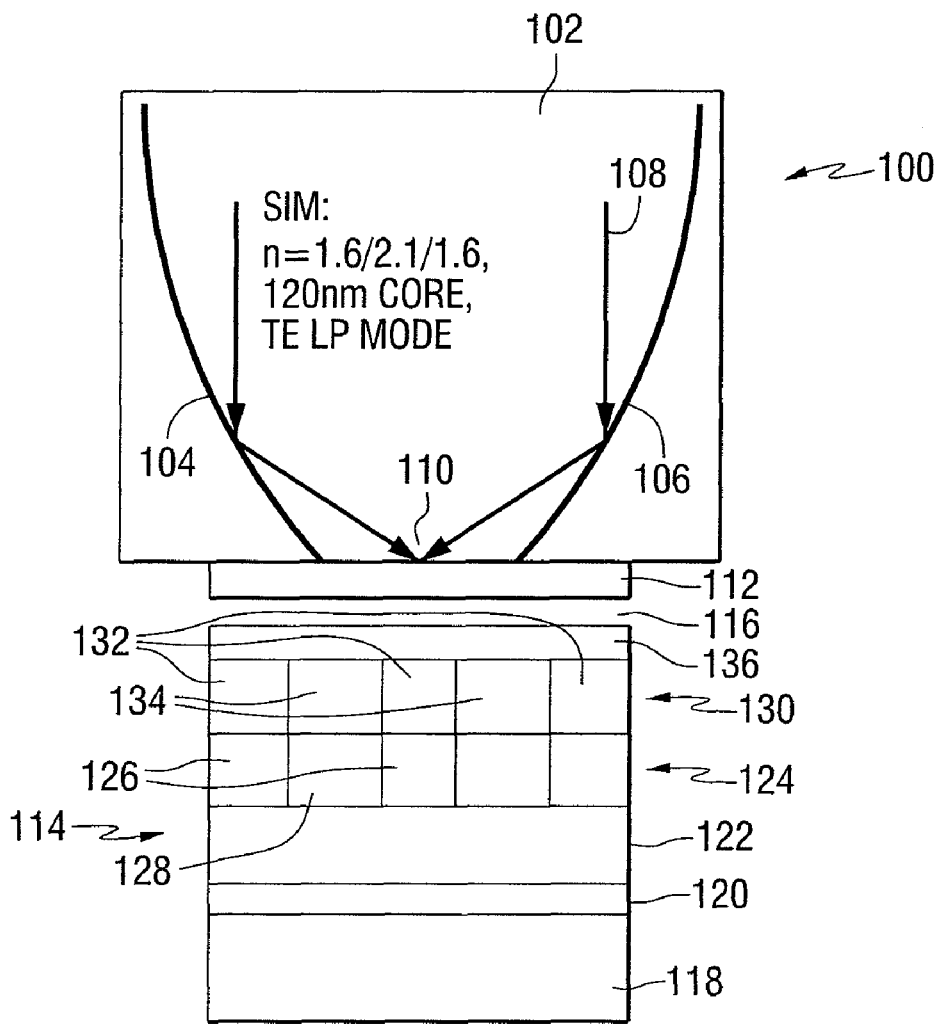
FIG. 6 is a schematic representation of a model of an aspect of the invention.

FIG. 6 is a schematic diagram of a system used for the finite-difference time-domain (FDTD) modeling. The system of FIG. 6 includes an optical transducer 100 in the form of a planar solid immersion mirror (SIM), as may be found in a recording head. The SIM in this example has a 120 nm core layer with cladding layers (not shown) on opposite sides of the planar core layer. The indices of refraction of the layers in the SIM stack are n=1.6/2.1/1.6. Substantially parabolic mirrors or interfaces 104, 106 are used to reflect light 108 to a focal point 110. The transducer is operated in a transverse electric (TE) local plasmon (LP) mode. A layer of 2.5 nm diamond-like coating (DLC) 112 is provided at the truncated end of the waveguide. The diamond-like coating is separated from the recording media 114 by an air bearing 116, having a thickness of 2.5 nm.

The recording media 114 includes a Si substrate 118 and a 10 nm $SiO_2$ native oxide layer 120 on the substrate. A 20 nm MgO thermal resistor 122, or thermal control layer, is positioned on the native oxide. A 10 nm recording layer 124 is positioned on the thermal resistor and includes a plurality of islands 126 of magnetic material in an array. In this example, the islands are cylinders having a diameter of 50 nm. A non-magnetic material 128 surrounds the islands in the recording layer. The non-magnetic material 128 would be the filler material described above. Alumina was used in the modeling described below.

A 10 nm layer 130 is positioned on the recording layer and includes a plurality of near-field transducers 132 separated by a MgO filler 134. The near-field transducers are Au disks having a diameter of 50 nm. Each of the near-field transducers is positioned adjacent to one of the magnetic material islands. A 2.5 nm overcoat layer 136 is positioned on layer 130.

Figure 7:
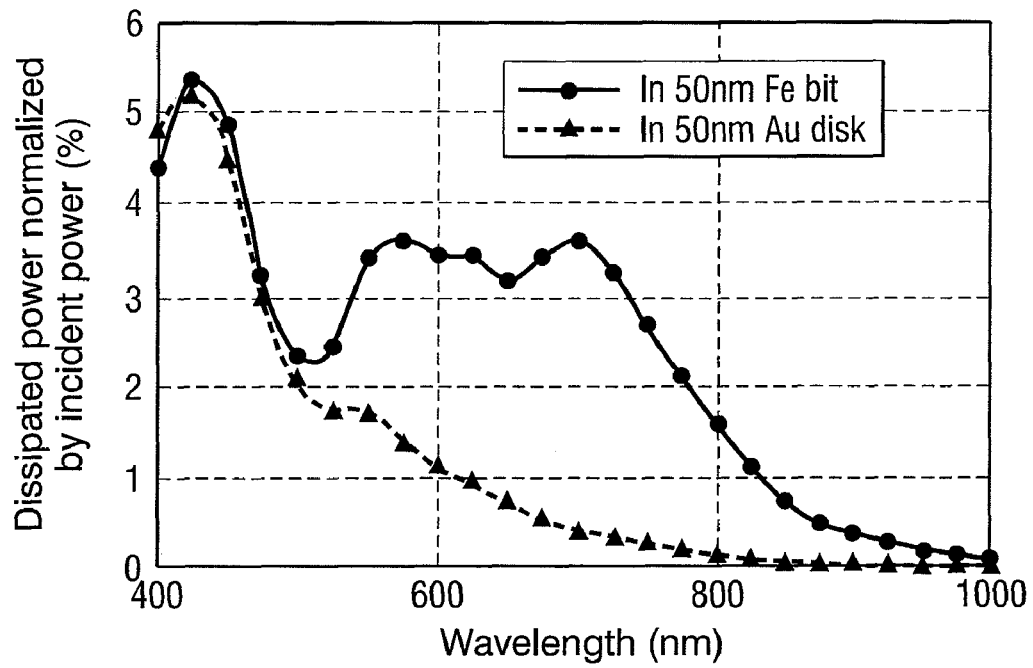
FIGS. 7, 8 and 9 are graphs of power dissipation versus wavelength.
Figure 8:
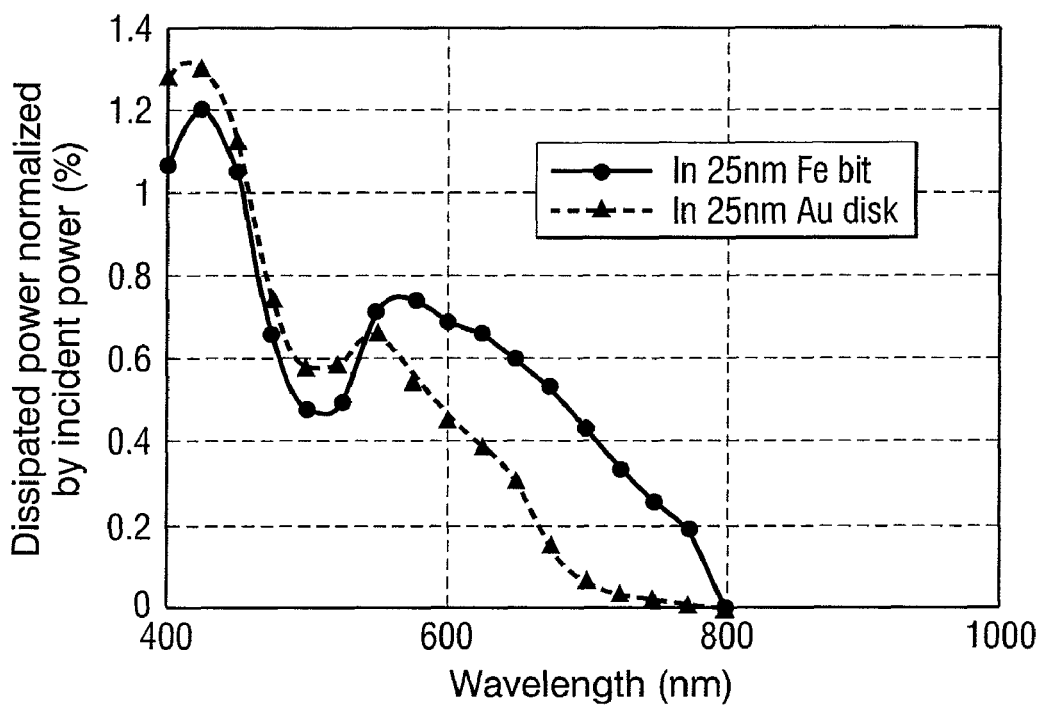

In FIG. 6, the media islands are in the shape of cylinders. The SIM is modeled along with the media, and the optical spot size becomes smaller with decreasing wavelength. For modeling purposes, the magnetic material in the islands was assumed to be iron. FIGS. 7 and 8 show the absorption versus wavelength for 50 nm and 25 nm diameter iron (Fe) magnetic islands with like-sized gold (Au) NFTs in the BPM, respectively. When the thickness of the Au NFT disk was increased from 10 nm to 20 nm, the maximum power absorbed by the Au went from about 5% to about 11%. The power absorbed by the Fe dropped slightly, but stayed substantially constant at about 5%. Thickening the Fe is likely to have the same effect and cause more power to be absorbed by the Fe. As a first estimate, if the percentages of power absorbed by the Au and Fe are added, about 16% of the power is being absorbed by the media.

Figure 9:
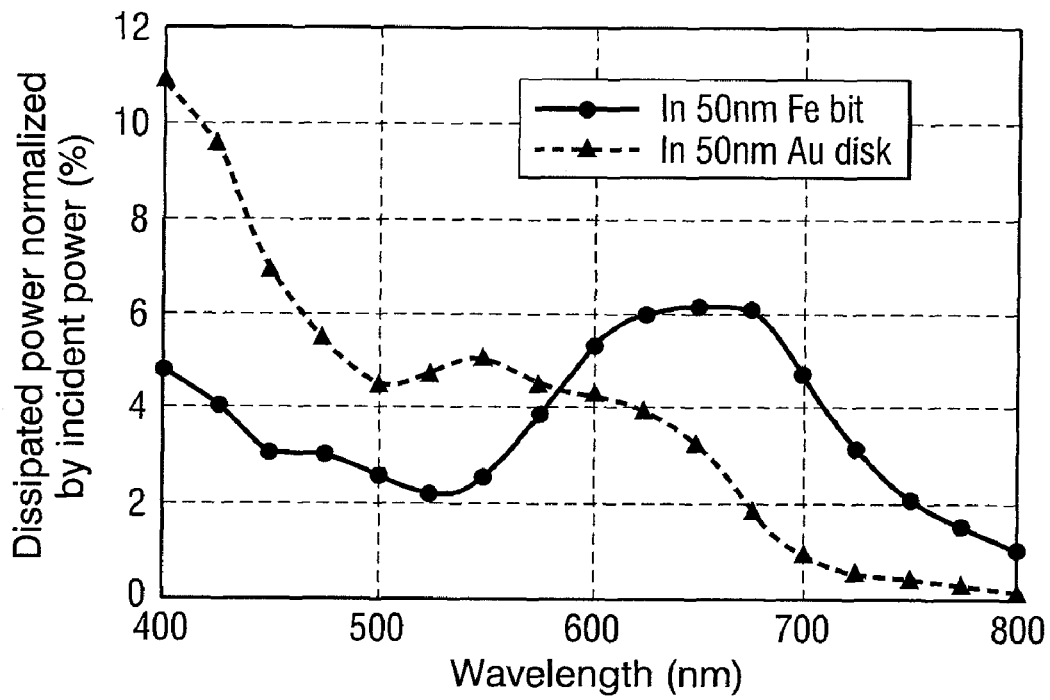

FIG. 9 shows FDTD modeling results for a 20 nm thick Au NFT disk having a diameter of 50 nm on an Fe island having a diameter of 50 nm.

Figure 10:
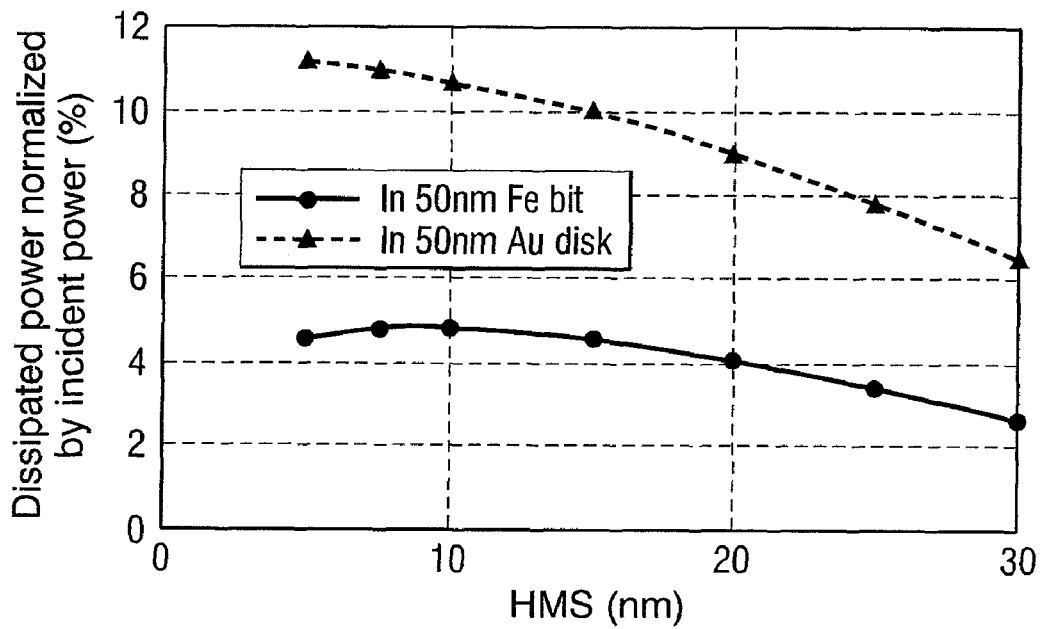
FIG. 10 is a graph of power dissipation versus head to media spacing.

FIG. 10 shows FDTD modeling results for the fly height dependence. FIG. 10 shows the fly height dependence for a 20 nm thick Au disk and light wavelength $\lambda$ of 400 nm. Increasing the fly height from 5 nm to 20 nm only decreases the efficiency from about 15.5% to about 13%, thus this design is relatively independent of fly height.

Figure 11:
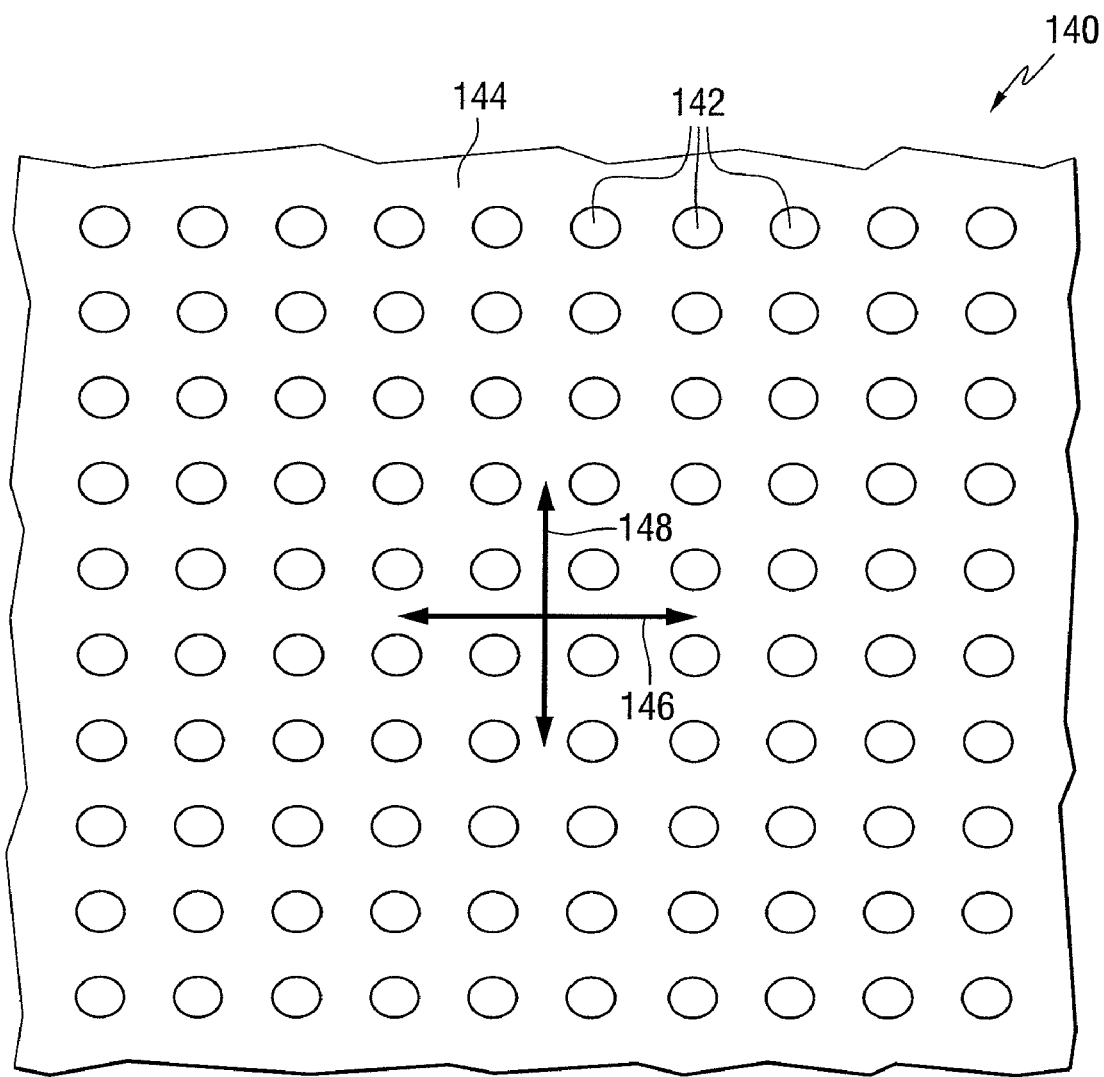
FIG. 11 is a plan view of a recording media constructed in accordance with an aspect of the invention.

FIG. 11 shows a plan view of a portion of a BPM disc including an array of magnetic islands 142 embedded in a non-magnetic material 144.

Modeling based on the media of FIG. 11 shows that for adjacent bits in the cross track direction 146, only 0.66% of the light was absorbed by the Fe and 1.13% was absorbed by the Au. For adjacent bits in the down track direction 148, only 0.89% of the light was absorbed by the Fe and 0.98% was absorbed by the Au. The asymmetry is due to the down track confinement being better than the cross track confinement for this particular case. The amount of light absorbed in adjacent bits could be further reduced by decreasing the wavelength, increasing the mode index of the waveguide, and/or increasing the index difference between the cladding and core and adjusting the core thickness accordingly.

Thermal modeling was performed using finite element modeling (FEM). The following parameters were used for the media materials, wherein: k_Fe=100, k_Au=200, k_MgO=1, and k_Si=0 W/m–K, refer to the media structure, where "k" is the thermal conductivity in units of Watts/(meter–Kelvin) or W/m–K. An incident power of 1 mW was used, which is the optical power in the SIM. The peak temperature change dropped from about 350° C. to about 150° C. when the Au disk was removed from the media stack, illustrating the benefits of including the NFT as part of the media. Only 1 mW of optical power was used in the modeling. If there were only a 10% efficiency, a 350° C. temperature change could be achieved with a 10 mW laser, and a Vertical Cavity Surface Emitting Laser could be used if desired.

Figure 12:
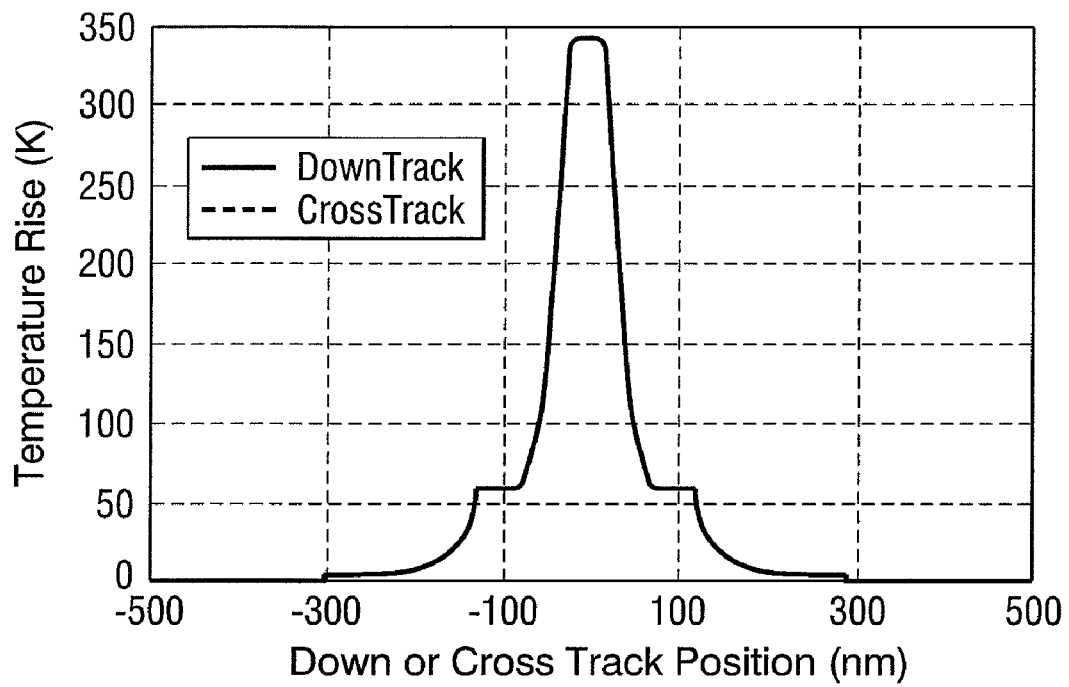
FIG. 12 is a graph of temperature rise versus down track or cross track position.

FIG. 12 shows a temperature profile in the cross track and down track directions. The data in FIG. 12 shows the temperature difference between the bit being written and the adjacent bits. The center bit is about 350° C. and the adjacent bits are about 65° C. It can also be seen that the thermal profile across the bit is very flat.

Figure 13:
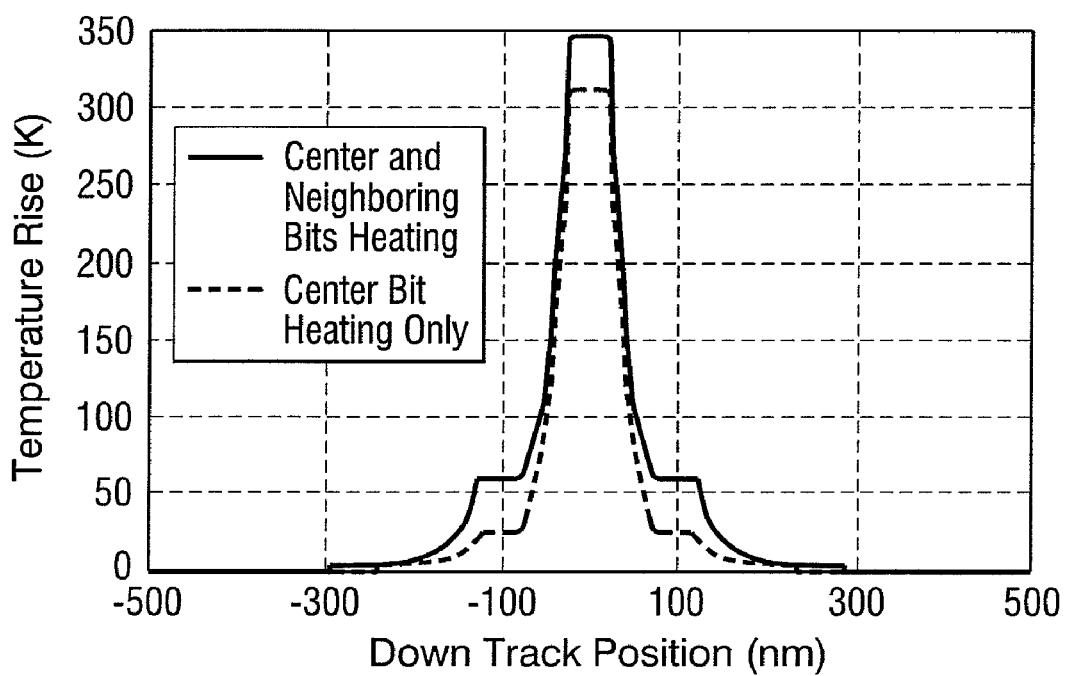
FIG. 13 is a graph of temperature rise versus down track position.

FIG. 13 shows the heating effect from the adjacent bits. If, for modeling purposes, the heating from the adjacent bits is turned off, the temperature of the center bit does not change significantly and the temperature of the adjacent bits drops significantly, which indicates that there is little thermal crosstalk between the bits.

When an SIM is used to focus the light, it is beneficial to use a shorter wavelength to form a smaller spot so that more of the light can be focused on a single bit. The materials surrounding the NFT in the media can be optimized to increase the resonance at the shorter wavelength of about 405 nm. A NFT could be included in the recording head (as shown in FIGS. 2-4), in addition to the media, to reach very high areal densities, where the NFT in the head couples to the NFT in the media.

The NFT material in the media can be chosen to optimize absorption since this absorption will lead to heating of the media. This is not normally desirable when designing a NFT in the head, but it is desirable for this design. This could be achieved for example, where the Au used above is alloyed with Ag, Al, Cu, Cr, Ta, etc. Alloying Au with a material such as Ag, Al or Cu may preserve the plasmon resonance while increasing the resistivity and thus the absorption. Other materials could be used in the bit island stacks to improve the plasmon resonance at the desired wavelength.

Figure 14:
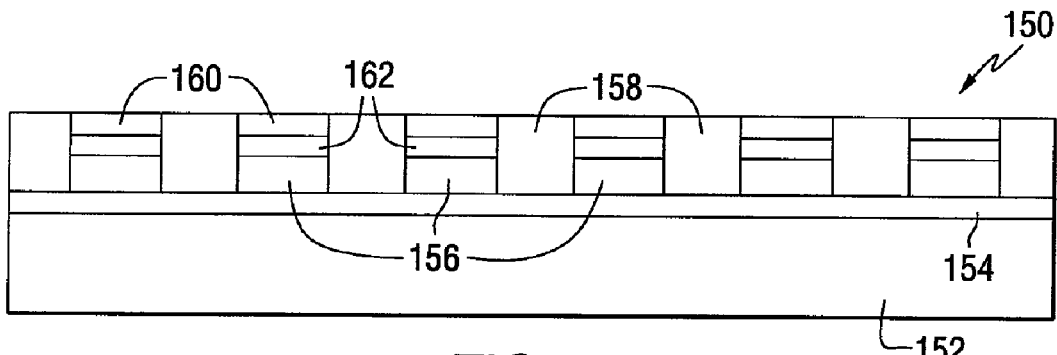
FIGS. 14-20 are cross-sectional views of recording media constructed in accordance with other aspects of the invention.

FIGS. 14-20 are cross-sectional views of recording media constructed in accordance with other aspects of the invention. FIG. 14 shows a media 150 having a substrate 152, a thermal control layer 154 on the substrate, and a plurality of islands 156 of magnetic material on the thermal control layer. The islands are embedded in a non-magnetic material 158. A near-field transducer 160 is positioned over each of the islands and is separated from the magnetic material of the islands by a spacer 162.

Figure 15:
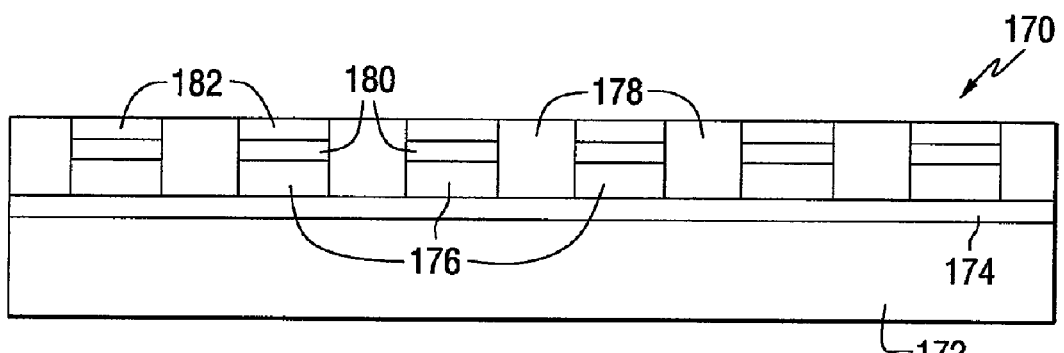

FIG. 15 shows a media 170 having a substrate 172, a thermal control layer 174 on the substrate, and a plurality of islands 176 of magnetic material on the thermal control layer. The islands are embedded in a non-magnetic material 178. A near-field transducer 180 is positioned on each of the islands and is separated from the top surface of the media by a capping layer 182.

Figure 16:
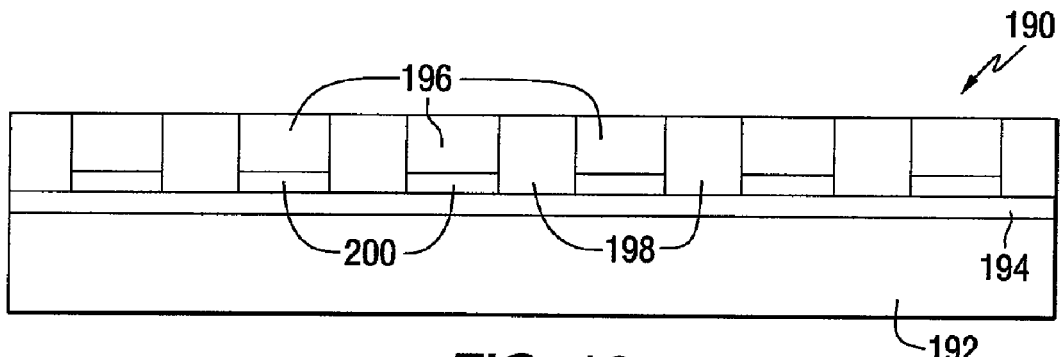

FIG. 16 shows a media 190 having a substrate 192, a thermal control layer 194 on the substrate, and a plurality of islands 196 of magnetic material. The islands are embedded in a non-magnetic material 198. A near-field transducer 200 is positioned under each of the islands.

Figure 17:
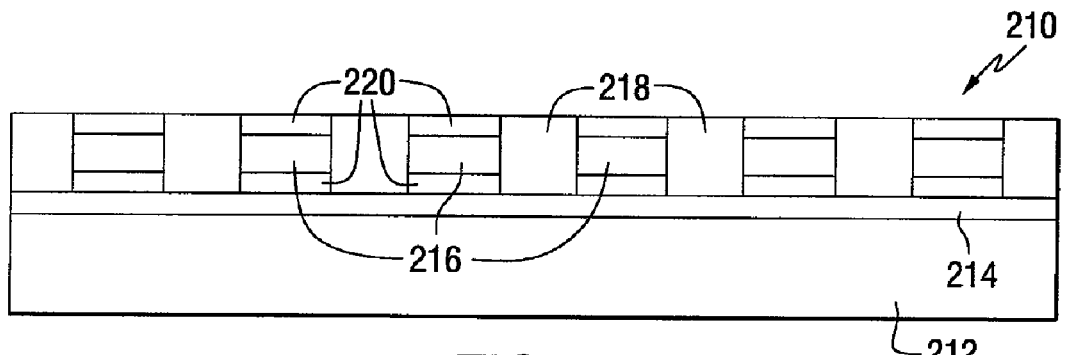

FIG. 17 shows a media 210 having a substrate 212, a thermal control layer 214 on the substrate, and a plurality of islands 216 of magnetic material. The islands are embedded in a non-magnetic material 218. Near-field transducer 220 is positioned on top of and under each of the islands.

Different materials could be used for the NFT, for the filler material, as a spacer between the NFT and media, and/or as a capping layer to the NFT. All of these materials will change the effective dielectric constant seen by the NFT.

Figure 18:
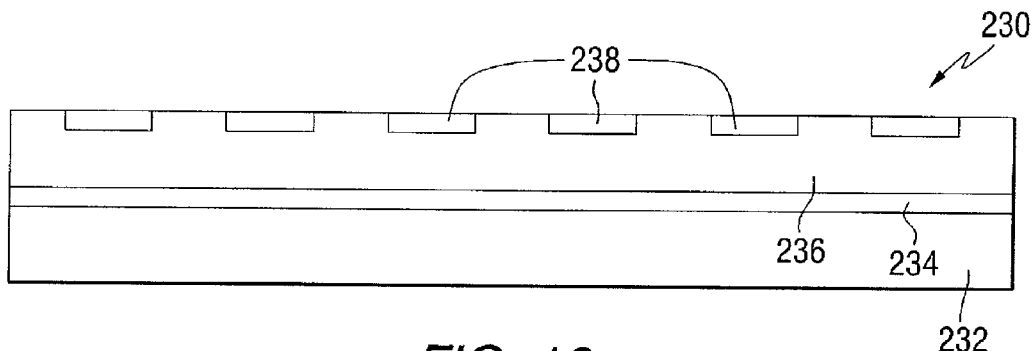
Figure 19:
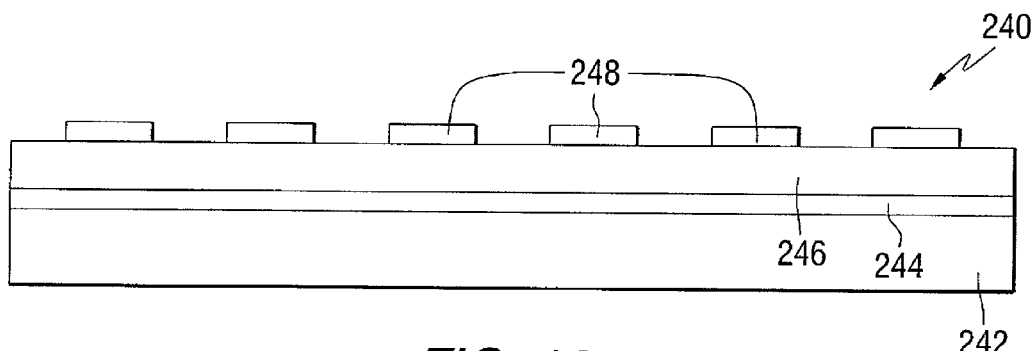
Figure 20:
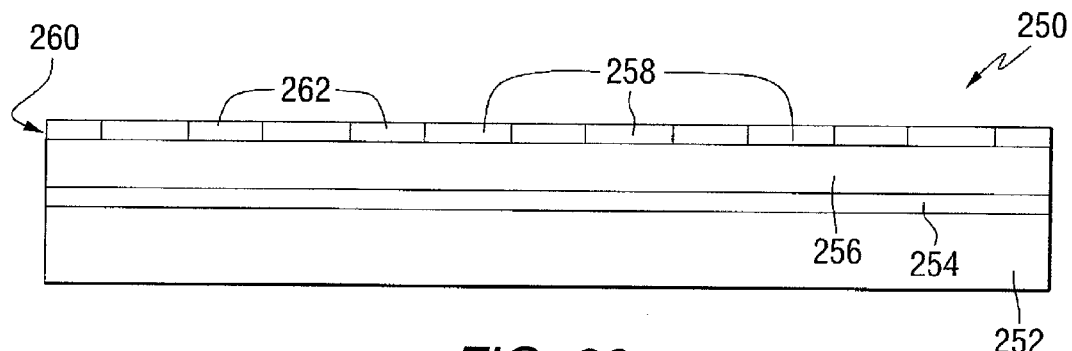

In another aspect, an array of NFTs may be used on a continuous layer magnetic material, as shown in FIGS. 18, 19 and 20. In FIG. 18, the media 230 includes a substrate 232, a thermal control layer 234 on the substrate, and a continuous layer 236 of magnetic material on the thermal control layer. Near-field transducers 238 are embedded in an array in the magnetic material 236. The media will absorb power even where there is not a NFT, but absorption will be greatly enhanced where the NFT is located.

In FIG. 19, the media 240 includes a substrate 242, a thermal control layer 244 on the substrate, and a continuous layer 246 of magnetic material on the thermal control layer. Near-field transducers 248 are positioned in an array on the magnetic material 246.

In FIG. 20, the media 250 includes a substrate 252, a thermal control layer 254 on the substrate, and a continuous layer 256 of magnetic material on the thermal control layer. Near-field transducers 258 are positioned in an array in a layer 260 on the magnetic material 256. Layer 260 includes a filler material 262 between the near-field transducers.

In the described examples, the thicknesses of the Au layers and media layer can be set to optimize the absorption and heating. In addition, the bit aspect ratio (BAR) can be changed from the 1:1 used above. This will help reduce the heating of the adjacent bits. The heating gradient in the down track direction should be better than the modeling above shows, if the sharpest part of the optical gradient is aligned with the bit transitions.

By changing the BAR or the materials used, the resonance of the NFT should be able to be shifted to longer wavelengths, i.e., 660 nm, 780 nm or 830 nm, where inexpensive laser diodes are commercially available.

Figure 21:
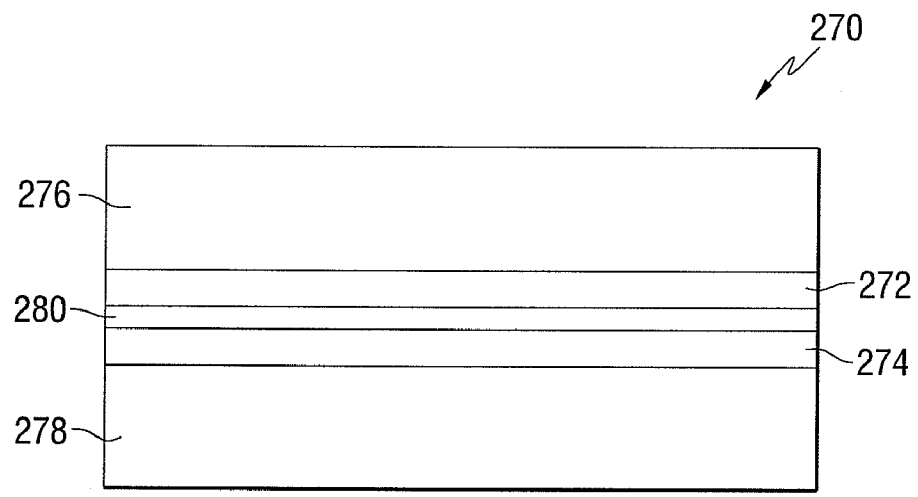
FIG. 21 is a cross-sectional view of a slot waveguide.

A "slot" waveguide designed for TM modes can be used in the recording head to create very tight down track confinement, as shown in FIG. 21. FIG. 21 shows a cross-section of a slot waveguide (WG) 270, including two layers 272, 274 of a high index material between layers 276, 278 of a low index material. Another layer 280 of low index material is positioned between layers 272 and 274.

Figure 22:
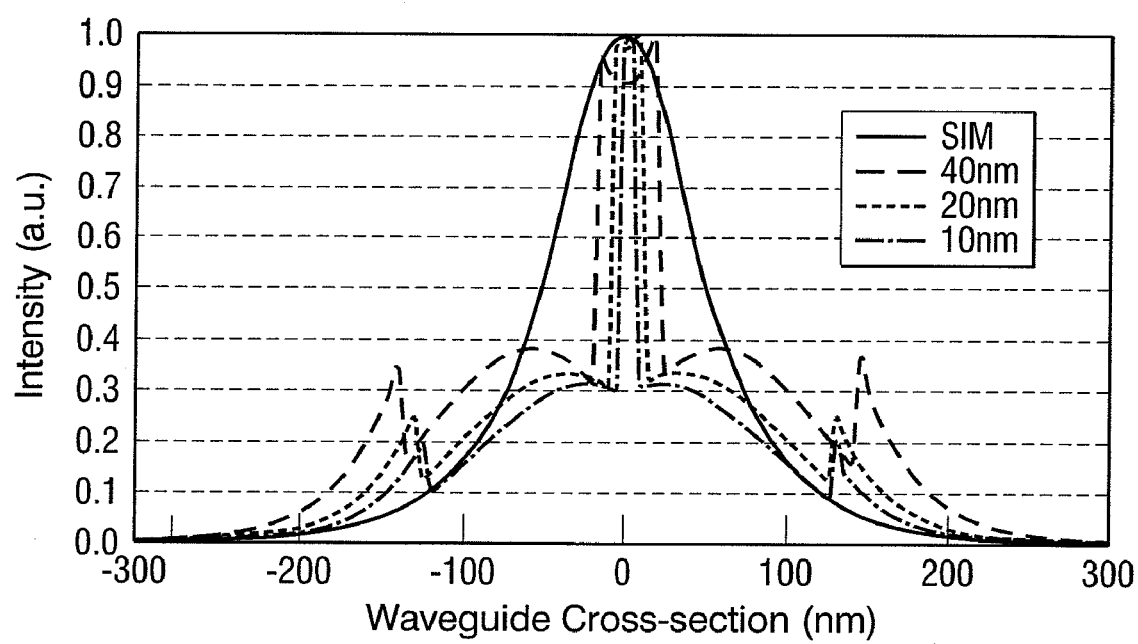
FIG. 22 is a graph of intensity versus waveguide cross-section.

FIG. 22 shows mode profiles of a SIM WG and for three different slot WGs with different inner low index layer thicknesses. It can be seen that the down track mode confinement can be much better for the slot WG than for the SIM WG. In addition, the mode index is over 2.0 for the TM mode in the slot WG, compared to about 1.85 for a TE mode in a SIM WG, which will lead to a smaller spot in the cross track direction also. The slot WG achieves this confinement due to the discontinuity in the permittivity in the WG. Unfortunately, the confinement is lost when brought into close proximity to the continuous magnetic media, since there is no discontinuity in the media. For the media described here, the media is no longer continuous, so this discontinuity allows a slot WG to achieve superior down track confinement.

While the invention has been described in terms of several examples, it will be apparent to those skilled in the art that various changes can be made to the disclosed examples without departing from the scope of the invention as defined by the following claims. The implementations described above and other implementations are within the scope of the claims.

What is claimed is:

1. An apparatus comprising:
a recording media including a substrate, a plurality of islands of magnetic material on the substrate, and a non-magnetic material between the islands;
a recording head having an air bearing surface positioned adjacent to the recording media, and including a magnetic pole, and an optical transducer, wherein the optical transducer directs electromagnetic radiation onto recording media to heat portions of the recording media and a magnetic field from the magnetic pole is used to set the direction of the magnetization in the heated portions of the recording media; and
a plurality of near-field transducers embedded in the recording media, each of the near field transducers being positioned adjacent to one of the islands to increase coupling between the electromagnetic radiation and the magnetic material.

2. The apparatus of claim 1, further comprising:
a thermal control layer between the substrate and the plurality of islands of magnetic material.

3. The apparatus of claim 1, wherein the near-field transducers comprise a plasmonic material.

4. The apparatus of claim 1, wherein the near-field transducers are positioned on top of the magnetic material, or under the magnetic material, or both on top of and under the magnetic material.

5. The apparatus of claim 4, further comprising:
spacers between the near-field transducers and the magnetic material.

6. The apparatus of claim 1, further comprising:
a heatsink layer on the substrate.

7. The apparatus of claim 1, wherein the optical transducer comprises:
a solid immersion mirror.

8. The apparatus of claim 1, wherein the optical transducer comprises:
a slot waveguide.

9. The apparatus of claim 1, wherein the recording head includes another near-field transducer.

10. The apparatus of claim 1, wherein the near-field transducers comprise:
one or more of Au, Ag, Al, or Cu, or an alloy of Au, Ag, Al, or Cu and one or more of Pt, Pd, Rh, Ir, Cr, Ta, Fe, and Co.

11. An apparatus comprising:
a recording media including a substrate and a continuous layer of magnetic material on the substrate;
a recording head having an air bearing surface positioned adjacent to the recording media, and including a magnetic pole, and an optical transducer, wherein the optical transducer directs electromagnetic radiation onto recording media to heat portions of the recording media and a magnetic field from the magnetic pole is used to set the direction of the magnetization in the heated portions of the recording media; and
a plurality of near-field transducers in the recording media, each of the near-field transducers being positioned adjacent to or embedded in the continuous layer of magnetic material of the recording media.

12. The apparatus of claim 11, further comprising:
a thermal control layer between the continuous layer of magnetic material and the substrate.

13. The apparatus of claim 11, wherein the near-field transducers comprise plasmonic material.

14. The apparatus of claim 11, wherein the near-field transducers are positioned on top of the magnetic material, or under the magnetic material, or both on top of and under the magnetic material.

15. The apparatus of claim 14, further comprising:
spacers between the near-field transducers and the magnetic material.

16. The apparatus of claim 11, further comprising:
a heatsink layer on the substrate.

17. The apparatus of claim 11, wherein the optical transducer comprises:
a solid immersion mirror.

18. The apparatus of claim 11, wherein the optical transducer comprises:
a slot waveguide.

19. The apparatus of claim 11, wherein the recording head includes another near-field transducer.

20. The apparatus of claim 11, wherein the near-field transducers comprise:
one or more of Au, Ag, Al, or Cu, or an alloy of Au, Ag, Al, or Cu and one or more of Pt, Pd, Rh, Ir, Cr, Ta, Fe, and Co.

* * * * *